(12) United States Patent
Dunn et al.

(10) Patent No.: US 6,887,421 B2
(45) Date of Patent: May 3, 2005

(54) METHOD FOR MAKING A SILICON CARBIDE RESISTOR WITH SILICON/SILICON CARBIDE CONTACTS BY INDUCTION HEATING

(75) Inventors: Michael P. Dunn, Clarence Center, NY (US); Brian M. Tierney, Newfane, NY (US)

(73) Assignee: Redunndant Materials, Inc., Clarence Center, NY (US)

( * ) Notice: Subject to any disclaimer, the term of this patent is extended or adjusted under 35 U.S.C. 154(b) by 569 days.

(21) Appl. No.: 10/047,893

(22) Filed: Jan. 14, 2002

(65) Prior Publication Data

US 2003/0131629 A1 Jul. 17, 2003

(51) Int. Cl.[7] .............................................. B29C 67/20
(52) U.S. Cl. ...................... 264/413; 264/606; 264/616; 264/618; 264/676; 264/682; 65/43; 65/155
(58) Field of Search ............................... 65/40, 43, 155; 219/632, 633, 635, 637; 264/413, 606, 616, 618, 676, 682

(56) References Cited

U.S. PATENT DOCUMENTS

| | | | | | |
|---|---|---|---|---|---|
| 1,787,749 A | * | 1/1931 | Heyroth | ....................... | 29/621 |
| 2,060,393 A | * | 11/1936 | Heyroth | ....................... | 428/368 |
| 2,125,075 A | * | 7/1938 | MacKenzie | ................. | 264/616 |
| 2,188,693 A | * | 1/1940 | Thompson | .................. | 264/616 |
| 2,205,308 A | * | 6/1940 | Marcello | ..................... | 264/29.6 |
| 2,305,577 A | * | 12/1942 | Stoelting | ..................... | 338/21 |
| 3,171,871 A | * | 3/1965 | Watson | ....................... | 264/104 |
| 3,679,471 A | * | 7/1972 | Wyss | .......................... | 338/223 |
| 3,859,399 A | * | 1/1975 | Bailey et al. | ............... | 264/29.1 |
| 3,895,219 A | * | 7/1975 | Richerson et al. | .......... | 219/553 |
| 3,998,646 A | * | 12/1976 | Weaver | ....................... | 264/655 |
| 4,032,371 A | * | 6/1977 | Andersen | ....................... | 438/54 |
| 4,205,363 A | * | 5/1980 | Boos et al. | .................. | 361/264 |
| 4,230,497 A | * | 10/1980 | Schwetz et al. | .............. | 501/89 |
| 4,336,216 A | * | 6/1982 | Watanabe et al. | ........... | 264/616 |
| 4,701,427 A | * | 10/1987 | Boecker et al. | ............... | 501/92 |
| 4,795,673 A | * | 1/1989 | Frechette et al. | ........... | 428/331 |
| 5,322,824 A | * | 6/1994 | Chia | ........................... | 501/89 |
| 6,695,984 B1 | * | 2/2004 | Odaka et al. | ............... | 252/504 |
| 2003/0021901 A1 | * | 1/2003 | Gasse | ...................... | 427/376.2 |

* cited by examiner

*Primary Examiner*—Sean Vincent
(74) *Attorney, Agent, or Firm*—Michael L. Dunn

(57) ABSTRACT

A method for bonding an electrically conductive silicon carbide structure to an electrically conductive siliconized silicon carbide structure by temporarily securing the siliconized silicon carbide structure to the silicon carbide structure; placing the silicon carbide structure with secured siliconized silicon carbide structure into an induction heating furnace having an induction coil which heats electrically conductive material in the furnace when sufficient electrical power at a frequency of from about 300 to about 1000 KC is passed through the coil; and causing sufficient electrical power at a frequency of from about 300 to about 1000 KC to be passed through the coil to raise the temperature of the siliconized silicon carbide structure and silicon carbide structure to a temperature above about 1500° C. at the region of temporary attachment to release the attachment and cause silicon metal to flow from the siliconized silicon carbide structure into the silicon carbide structure to form a siliconized silicon carbide bond between the silicon carbide structure and siliconized silicon carbide structure.

13 Claims, 4 Drawing Sheets

METHOD FOR MAKING A SILICON CARBIDE RESISTOR WITH SILICON/SILICON CARBIDE CONTACTS BY INDUCTION HEATING

BACKGROUND OF THE INVENTION

This invention relates to heating elements made of silicon carbide and more particularly relates to a method for making a recrystallized silicon carbide resistor having siliconized silicon carbide contacts.

Methods for making recrystallized silicon carbide resistors having siliconized silicon carbide contacts have been previously known. Such methods have involved the fusion of siliconized silicon carbide contacts with a recrystallized silicon carbide resistor by holding the resistor and contacts together, e.g. with a bonding resin, and indirectly heating the combination in a gas or electrical resistance heated furnace, e.g. a tube furnace, to fuse the contacts to the resistor by flow of silicon from the contacts into the resistor.

Such known methods are replete with problems and disadvantages. Such tube furnaces are typically made of graphite in order to withstand the high temperatures required, e.g. in excess of 1800° C. The graphite tube of the furnace is expensive and is consumed during repeated heating and cooling cycles. In addition to cost of the graphite tube, replacement causes costly and inefficient down time.

Further, in resistance heated furnaces, relatively costly graphite electrodes must be periodically replaced again resulting in costly down time.

Other consumable components for graphite tube furnaces include graphite crucibles or boats that carry parts, insulation, and various electrical components including transformers.

Fusion of contacts to resistors, as described above, require vacuum or an inert atmosphere. Due to cooling requirements for the shell of the furnaces, the furnaces must be large relative to parts being treated, thus use of a vacuum is impractical and the required volume of inert gas is very large relative to the size of the parts thus adding more inefficiency and cost.

Additionally, such known methods are exceedingly inefficient with respect to required heat energy. As with most indirect heating methods, energy is lost by undesirably heating furnace components rather than the article to be treated. In particular, there are heat losses in the furnace wall, loss through radiation, loss through conveyors for parts, atmospheric heat losses and undesirable heat storage. Further, in known methods, the entire part was heated rather than only a localized area of the part that required heating. The efficiency in heating the contacts to fuse them to the resistor in known method could thus be expected to be less than 5%.

BRIEF SUMMARY OF THE INVENTION

In accordance with the invention, a method is provided for bonding an electrically conductive silicon carbide structure to an electrically conductive siliconized silicon carbide structure which in a preferred embodiment may take the form of a method making a recrystallized silicon carbide resistor having siliconized silicon carbide contacts. The method includes the following steps.

In an initial step, a siliconized silicon carbide structure, e.g. in the form of electrical contacts is temporarily held, e.g. with a resin bond, to a silicon carbide structure, e.g. first and second ends of a recrystallized silicon carbide resistor. The siliconized silicon carbide contacts, when bonded to the resistor with siliconized silicon carbide, are preferably made to carry sufficient current to the silicon carbide resistor to obtain a temperature rise in the resistor above 600° C. without a more than 100° C. rise in temperature of free ends of the contacts.

In a further step, the silicon carbide, e.g. a resistor, with resin bonded siliconized silicon carbide, e.g. electrical contacts, is placed into an induction heating furnace having an induction coil which heats electrically conductive material in the furnace when sufficient electrical power at a frequency of from about 300 to about 1000 KC is passed through the coil.

In yet another step, sufficient electrical power at a frequency of from about 300 to about 1000 KC is passed through the coil to raise the temperature of the siliconized silicon carbide article, e.g. electrical contacts, and silicon carbide article, e.g. recrystallized silicon carbide resistor, to a temperature above about 1500° C. at the regions of the resin bonds to pyrolize the resin and cause silicon metal to flow from the siliconized silicon carbide into the silicon carbide to form a siliconized silicon carbide bond between the siliconized silicon carbide article and silicon carbide article.

After heating to cause fusion of the siliconized silicon carbide article and the silicon carbide article with silicon, the resulting article is cooled to obtain a silicon carbide article, e.g. a recrystallized silicon carbide resistor, and siliconized silicon carbide article, e.g. siliconized silicon carbide contacts, connected together with siliconized silicon carbide bonds.

The method of the invention, which provides direct heating at the location of attachment between the siliconized silicon carbide article, e.g. contacts, and the silicon carbide article, e.g. recrystallized silicon carbide resistor, permits non-conducting ceramic or quartz furnaces to be used essentially indefinitely since the furnace shell is not heated. This completely avoids the serious problem in known furnaces for making joints between siliconized silicon carbide and recrystallized silicon carbide associated with breakdown of the furnace shell due to required high temperature heating of the shell. Such furnaces were typically tube furnaces requiring a consumable graphite shell in order to withstand the high temperatures required, e.g. in excess of 1800° C. The method of the invention, therefore not only avoids replacement cost of the furnace shell but additionally avoids costly and inefficient down time.

Because of direct heating of the silicon carbide, in the method of the invention, by electromagnetic wave induction, the relatively costly graphite electrodes associated with furnaces used in the known art for fusing siliconized silicon carbide to recrystallized is also avoided as is the down time associated with their replacement.

In addition, other consumable components associated with graphite tube furnaces, including graphite crucibles or boats that carry parts, insulation, and various electrical components including transformers, are not required by the present invention.

Further, because the method of the invention requires less furnace volume and is much more rapid and efficient than methods of the prior art, a vacuum treatment environment can be efficiently used, as opposed to required larger furnace volumes associated with indirect heating methods. Optionally, inert gas atmospheres can also be used in conjunction with the method of the invention while requiring less inert gas per unit than traditional indirect heating methods for the same reasons previously described. Further, the method of the invention is more energy efficient than known methods for fusing siliconized silicon carbide to recrystallized silicon carbide by more than an order of magnitude, i.e. the method of the invention can take onetenth the energy of traditional heating methods. In the method of the invention relatively little energy is lost as compared with known indirect heating methods. In the method of the invention, using direct electromagnetic induction heating, little energy is lost by undesirably heating furnace components rather than the article to be treated. In particular, there is little heat lost in electrically non-conductive furnace walls. Radiation loss is greatly reduced since only the part being treated radiates significant heat. Conveyors made of non-conductive materials are not heated and there is therefore little heat storage in components other than the part being treated and the method permits heating of only the portion of the part that needs to be heated. The efficiency in heating the siliconized silicon carbide, e.g. contacts, to fuse them to the silicon carbide, e.g. a resistor, can thus be expected to be an order of magnitude better than known methods.

DETAILED DESCRIPTION OF THE INVENTION

Figure 1:
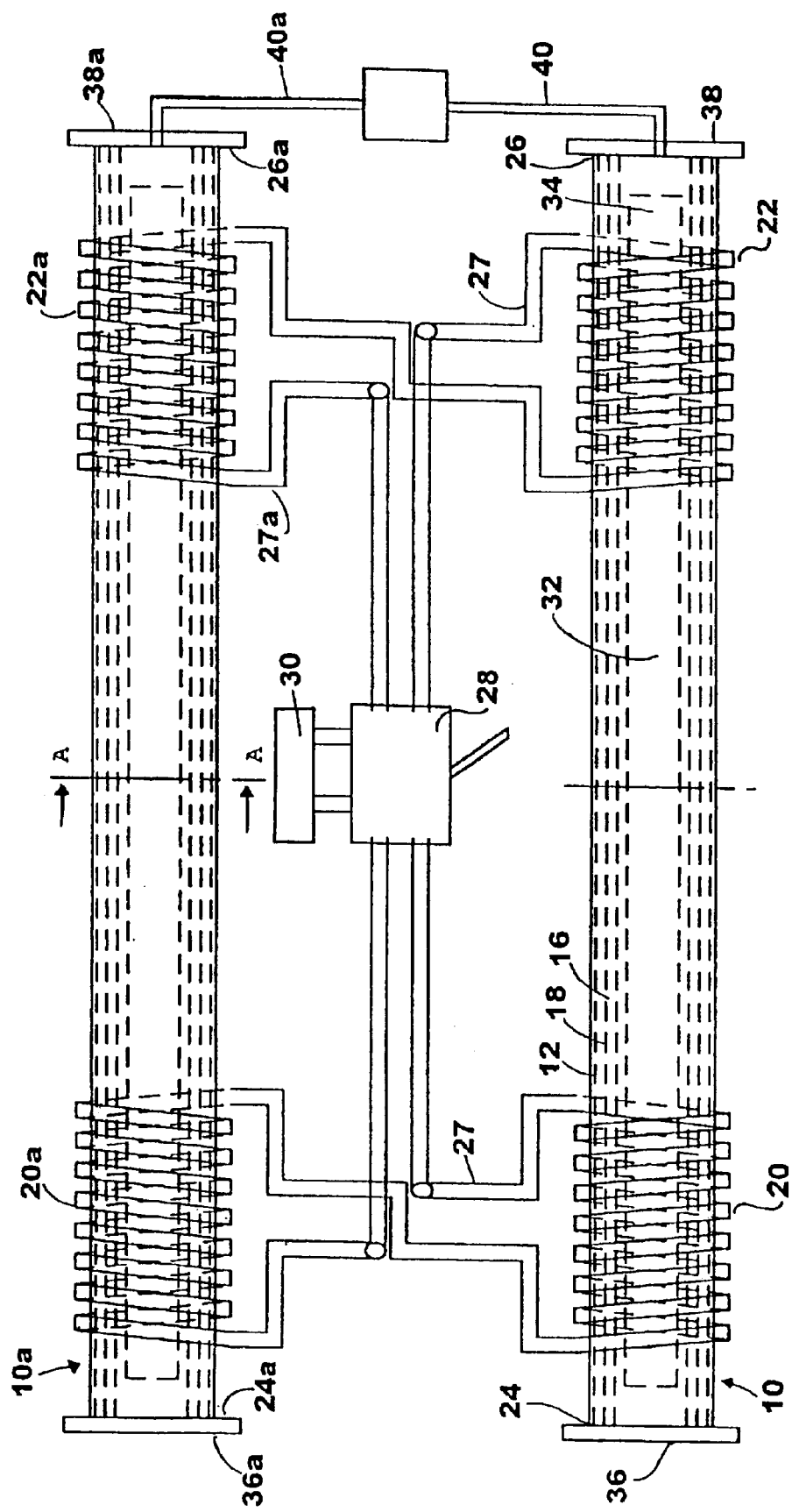
FIG. 1 shows a top view of a dual tube induction furnace for use in the method of the invention employing a vacuum.

The electrically conductive silicon carbide structure may be of essentially any size or shape; however, most commonly the structure has a longitudinal dimension that is from about 5 to about 50 times larger than its maximum width. The cross section perpendicular to the longitudinal dimension may have an irregular shape but is usually the shape of a circle, rectangle or regular polygon. When the structure is in the form of an electrical resistor, the maximum width is usually from about 5 to about 100 mm and the length is usually from about 25 mm to about 2M.

The silicon carbide normally used in accordance with the invention is a silicon carbide of high purity for electrical applications. The silicon carbide, in addition to normal components that impart semiconductor properties, may include dopants known to those skilled in the art to further increase conductivity. When the silicon carbide is used for a high temperature resistor, the silicon carbide is commonly recrystallized silicon carbide.

Siliconized silicon carbide is silicon carbide having pores filled with metallic silicon. The quantity of silicon in completely filled siliconized silicon carbide is directly proportional to the pores in the silicon carbide prior to filling. In any case, there is always a greater volume of silicon carbide in siliconized silicon carbide than silicon and the silicon carbide forms a continuous matrix containing the siliconized silicon carbide. The quantity of silicon in siliconized silicon carbide is usually less than ten weight percent. In practice of the present invention, silicon from the siliconized silicon carbide melts and flows upon the unsiliconized silicon carbide and bonds to it. "Silicon carbide" in the absence of language indicating that it is siliconized, is intended to mean unsiliconized silicon carbide.

Prior to placing the siliconized silicon carbide structure and unsiliconized silicon carbide structure into the induction furnace, the two structures are temporarily tightly secured to each other so that melted silicon does not have to span any significant space before melting onto and bonding with the unsiliconized silicon carbide. The structures may be tightly secured to each other by any suitable means, e.g. electrically non-conductive ceramic clamps, but are most frequently secured to each other by a pyrolizable resin bond.

The secured together siliconized silicon carbide and unsiliconized silicon carbide are placed into an induction furnace where an electromagnetic field passes through the secured together portions to heat the secured together portions causing silicon from the siliconized silicon carbide to melt onto the unsiliconized silicon carbide to form a bond. The electromagnetic field preferably has a frequency of from about 300 to about 1000 kilocycles per second (KC) to heat both the siliconized and unsiliconized silicon carbide to a temperature of above 1800° C. The electromagnetic field is preferably formed by passing a current alternating at from about 300 to about 1000 KC through an induction coil. In the case of an electrical resistor, where the siliconized silicon carbide is in the form of electrical contacts, the power required per connection is from about 0.5 to about 10 kWh depending upon the size of the furnace and resistor. For a one and one-quarter inch diameter resistor, five feet long, in an optimized induction furnace, the power per connection is about 2.5 kWh as opposed to about 30 kWh in a resistance heated tube furnace that indirectly heats the structure. The energy applied in the present invention is usually higher but is for a shorter period of time, resulting in less power usage.

In accordance with the invention, sufficient heating occurs very rapidly, e.g. in less than twelve minutes, preferably less than eight minutes, and most preferably less than four minutes. This is in stark contrast to the lengthy times required to use traditional indirect heating furnaces and methods which for the same bond can take ten times as long or longer.

The heating is done in an inert environment, which may either be a vacuum or an atmosphere of inert gas. When a vacuum is used, a partial vacuum at least as low as about 20 Torr and preferably as low as about 5 Torr is used. When an atmosphere of inert gas is used, the preferred inert gas is argon due to its ready availability and low cost.

After heating the siliconized silicon carbide and unsiliconized silicon carbide together, to melt silicon from the siliconized silicon carbide to the unsiliconized silicon carbide, the structure is allowed to cool at room temperature to obtain an article including a siliconized silicon carbide portion and an unsiliconized silicon carbide portion connected with at least one siliconized silicon carbide bond.

Figure 2:
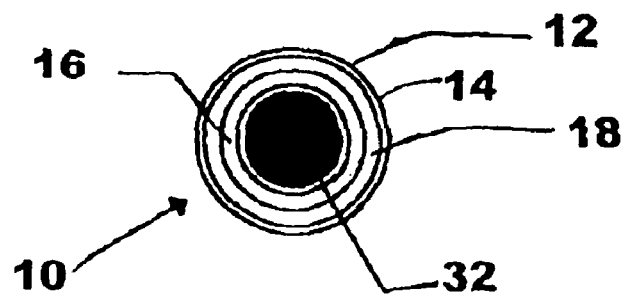
FIG. 2 shows a cross sectional view of an insulated quartz tube used in the furnace of FIG. 1.

In the following examples 1 and 2, an induction furnace was used to fuse electrically conductive siliconized silicon carbide contacts to recrystallized silicon carbide resistors. The resistors and contacts had an outside dimension of from about 2 to about 4 cm (¾ to 1.5 inches). As seen in FIGS. 1 and 2 of the drawings, the furnace 10 was a quartz tube 12 having an outside dimension of about 7.5 cm (3 inches) with a sidewall thickness 14 of about 3 mm (⅛ inch). The tube 12 was about 245 cm (96 inches) long around an alumina refractory brick cylinder 16 having an outside dimension of about 5.8 cm (2¼ inches) and an inside diameter of about 4.5 cm (1¾ inches). The refractory brick cylinder was also about 245 (96 inches) in length. The refractory brick cylinder 16 was wrapped with an insulating refractory fiber blanket 18 between the inside diameter of quartz tube 12 and the outside diameter of the refractory brick cylinder 16. None of the quartz tube 12, refractory brick cylinder 16 and refractory fiber blanket 18 was electrically conductive. Dual induction coils 20 and 22 were wrapped around the quartz tube 12 proximate opposing ends 24 and 26 of the quartz tube and were adjustable to vary the distance between the coils to accommodate elements of different lengths. The induction coils were constructed of eight turns of about one cm (3/8 inch) OD copper tube 27 around the quartz tube. The coils were about 14.5 cm (5.75 inches) long and were placed about 5 cm (2 inches) from the ends 24 and 26 of the quartz tube. A second furnace 10a, essentially identical to the first furnace 10 (having corresponding parts having the same numbers followed by "a".) was also constructed such that two induction coils 22 and 22a, one from each furnace, were placed in electrical series through transfer switch 28 to a power supply 30. Similarly induction coils 20 and 20a, one from each furnace, were also placed in series through transfer switch 28 to the power supply 30.

The plate input for the power supply can be maximized at 11,000 volts at 6.1 amperes or about a 65 KW input.

When fully activated, power supply 30 was able to provide an output of about 35 KW at a frequency of about 450 kcps. Output was adjustable by altering grid current using course adjustment taps and a fine tuning dial. Resistor 32 with contacts 34 to be heated to fuse the contacts 34 to resistor 32 is placed into the ceramic tube and is sealed therein by end caps 36 and 38. A vacuum tube 40 is connected through end cap 38 to vacuum pump 42 to permit the inside of tube 12 to be evacuated.

EXAMPLE 1

In a first example, a 25 cm (10 inch) long recrystallized silicon carbide resistors having a outside diameter of about 3.8 cm (1.5 inches) and an inside diameter of about 0.9 cm, each resin bonded to a single siliconized silicon carbide contact having a length of about 20 cm for a total a length of about 45 cm (17 1/8 inches), were placed in the above described furnaces so the joint between the resistor and contact was centered in a coil. The vacuum pump was then activated to draw a vacuum in each furnace of less than about 5 Torr. The coils surrounding the joints were than activated for two minutes. All test resistors made under these conditions showed a very good resistor to contact connection and were considered successful with good electrical continuity.

EXAMPLE 2

Example 1 was repeated except that the resistors had a diameter of about 2 cm and were about 25 cm (10 inches) long. The resin bonded contacts were also about 25 cm (10 inches) long and a contact was used at both ends of the resistor for a total length of about 75 cm (30 inches). Because of the short length, two sets of resistors and contacts could be placed end to end in a single furnace for at total of four units in both furnaces. The coils were adjusted so a joint was located in the center of a coil on each furnace. The vacuum pump was then activated to draw a vacuum of less than about 5 Torr and coils surrounding the centered joints were activated for 3 minutes 10 seconds. Coils were then moved to center two more joints and again activated after reestablishing the vacuum. Unfinished joints continued to be centered within coils and coils activated (four activations total) to finish the resistors with bonded contacts. A longer activation time for the coils than used in example 1 were required due to the greater distances of the smaller diameter resistors from the coils. The finished elements were found to be successfully welded with good electrical continuity.

EXAMPLE 3

Figure 4:
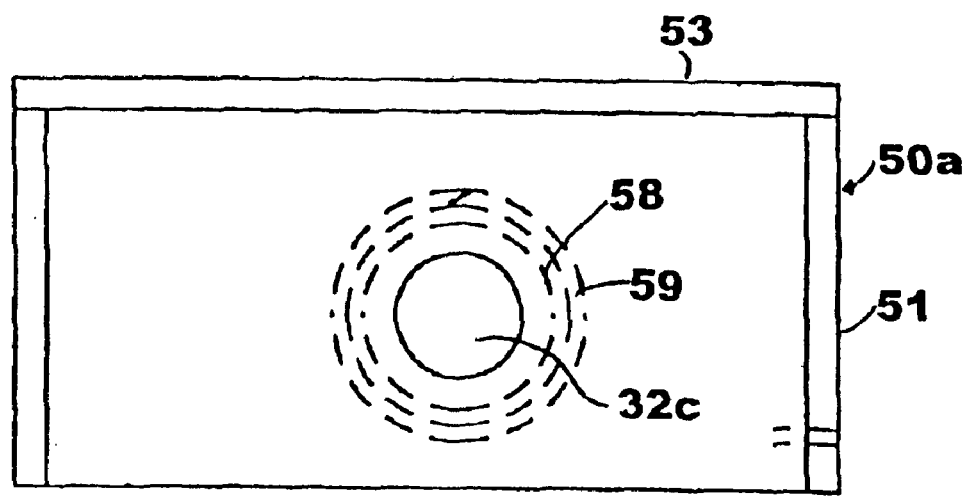
FIG. 4 shows an end view of an insulated refractory cylinder used in the furnaces of FIG. 3.
Figure 3:
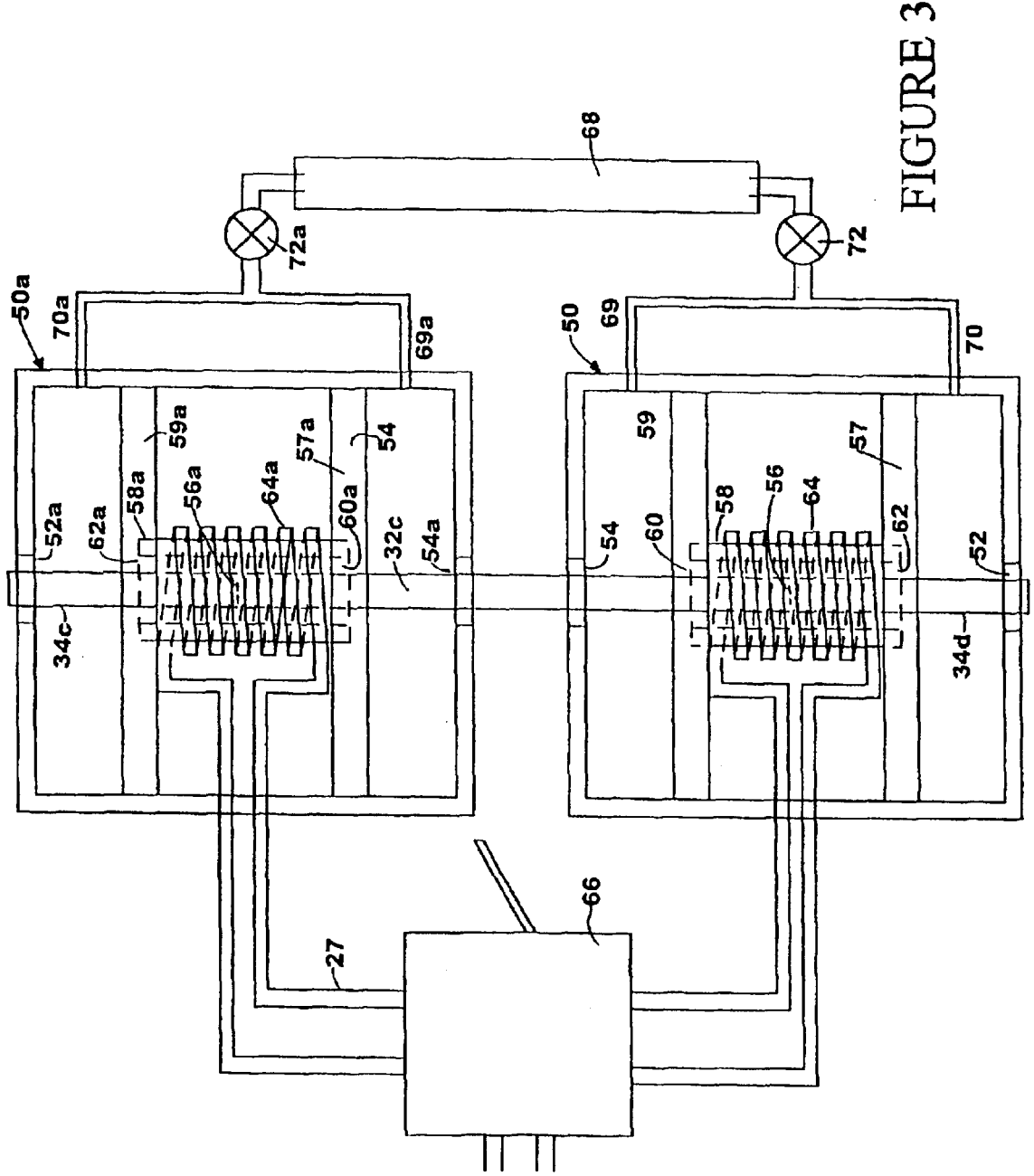
FIG. 3 shows a top view of a dual furnace structure, with tops removed, for use in accordance with the invention employing an inert atmosphere.

A furnace different than the furnace of examples 1 and 2 was used so that an inert gas atmosphere could be employed rather than a vacuum. The furnace, as shown in FIG. 3, included two furnace boxes 50 and 50a which had axially aligned holes 52, 54, 52a and 54a to permit a unit including a single resistor 32c with resin bonded contacts 34c and 34d, to pass through the openings so that one contact/resistor joint 56 is in one box 50 and an opposing contact/resistor joint 56a is in the other box 50a. The boxes 50 and 50a were made of electrically non-conducting ceramic fiber board, e.g. calcium silicate fiber board available under the MARINITE trademark. Sides 51, top 53 and partitions 54 were made from the board. Tubular furnace chambers 58 and 58a, made from refractory zirconia, were located inside of each of the furnace boxes 50 and 50a and are supported by walls 57, 59, 57a and 59a, respectively. The tubular furnace chambers were wrapped in an aluminum silicate blanket, e.g. 59, as seen in FIG. 4. Openings 60, 62, 60a and 62a were axially aligned with holes 52, 54, 52a, and 54a to permit passage of the combined resistor and contacts. Coils 64 and 64a of 6 turns of about 1 cm (3/8 inch) diameter copper tubing surround chambers 58 and 58a respectively and are connected to a power supply through a transfer switch 66. An argon source 68 is connected by means of conduits 69, 70, 69a and 70a through valves 72 and 72a respectively to provide argon into boxes 50 and 50a in such a way that argon passes through openings 60, 62, 60a and 62a into furnace chambers 58 and 58a. The furnace cylinders 58 and 58a had dimensions of about 7.5 cm (3 inches) in outside diameter, about 5 cm (2 inches) in inside diameter and a length of about 15 cm (6 inches) and were surrounded by an alumina silicate blanket about 60 mm (1/4 inch) thick. The boxes were mobile to permit movement toward and away from each other, while keeping holes 52, 62, 60, 54, 54a, 60a, 62a, and 52a aligned, so that joints of various length resistors and connectors could be accommodated to permit multiple joints to be centered within furnace chambers 58 and 58a and heated without repositioning the combined resistors and connectors. The movement permitted the distance between coils to be adjustable between about 60 cm (24 inches) and about 198 cm (78 inches). Wheels under the boxes permitted the desired motion.

In a test, three recrystallized silicon carbide resistors, about 0.6 cm (5/8 inch) in diameter and about 75 cm long including siliconized silicon carbide resin bonded contacts, were placed in parallel in the furnace. Argon flow was initiated at about 280 liters per hour and power at about 6 amps at about 450 KC and about 5500 volts was applied for 4 minutes and 10 seconds. The resulting three elements showed good siliconized silicon carbide bonds between the resistors and contacts with good electrical continuity.

EXAMPLE 4

Figure 5:
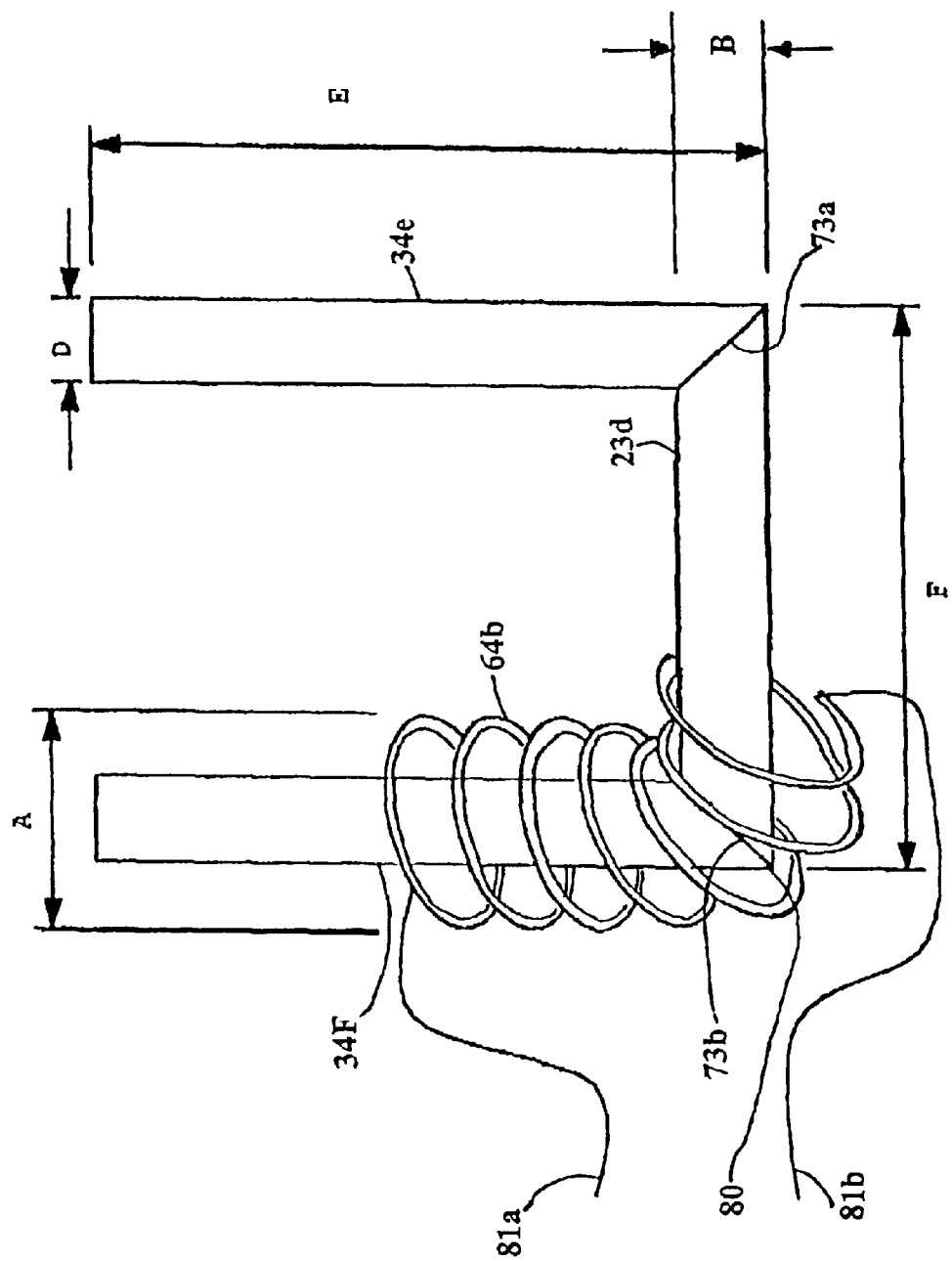
FIG. 5 shows a recrystallized SiC resistor with siliconized silicon carbide secured to the resistor at right angles within a coil.

The procedure of Example 3 was followed except that the recrystallized silicon carbide resistor 23d, as seen in FIG. 5, had an outside diameter B of about 2.5 cm (1 inch) and a length F of about 16.25 cm (6.5 inches). Siliconized contacts 34e and 34f having a length E of about 19 cm (7.5 inches) and a diameter D of about 2.5 cm (1 inch), were secured at right angles to ends 73a and 73b of the resistor 23d and the resulting formed corners 80 were placed within a coil 64b having an inside dimension A of about 6.25 cm (2.5 inches). The coil was formed of seven turns of copper tubing having an outside diameter of about 0.5 cm (3/16 inch). The coil was connected to a power supply of about 35 KW output at about 450 KC, by means of wires 81a and 81b.

The corners formed by the resistor (element) and contacts were held in place in the coil by quartz fixtures and alumina bubbles were poured around the corners for insulation. The entire structure was placed with a heat resistant box and argon gas was applied to purge and fill the box. Sufficient power was then applied to the coil to cause the siliconized contacts 34e and 34f to fuse to resistor 23d. The contacts 34a and 34f were thus firmly adhered to the resistor 23d.

In the above examples, in all cases, all bonding resin was completely gone, due to decomposition, sublimation of resin carbon and reaction of resin carbon with silicon to form silicon carbide. Any suitable organic resin may be used in the invention, since all such resins will decompose and disappear at the >1500° C. temperatures reached. To avoid the formation of corrosive atmospheres, halogenated and sulfur containing resins are to be avoided. Preferred resins contain carbon, hydrogen and oxygen, e.g. polycarbonates, polyesters, polyvinylacetates, etc. so that most resin by products are water, or carbon dioxide.

What is claimed is:

1. A method for bonding an electrically conductive silicon carbide structure to an electrically conductive siliconized silicon carbide structure comprising the steps of:
   a) temporarily securing the siliconized silicon carbide structure to the silicon carbide structure,
   b) placing the silicon carbide structure with secured siliconized silicon carbide structure into an induction heating furnace having an induction coil which heats electrically conductive material in the furnace when sufficient electrical energy at a frequency of from about 300 to about 1000 KC is passed through the coil;
   c) causing sufficient electrical energy at a frequency of from about 300 to about 1000 KC to be passed through the coil to raise the temperature of the siliconized silicon carbide structure and silicon carbide structure to a temperature above about 1500° C. at the region of temporary attachment to release the attachment and cause silicon metal to flow from the siliconized silicon carbide structure into the silicon carbide structure to form a siliconized silicon carbide bond between the silicon carbide structure and siliconized silicon carbide structure; and
   d) cooling the resulting silicon carbide structure and siliconized silicon carbide structure to obtain an article including a silicon carbide portion and siliconized silicon carbide portion connected with at least one siliconized silicon carbide bond.

2. A method for making a recrystallized electrically conductive silicon carbide resistor having electrically conductive siliconized silicon carbide electrical contacts comprising the steps of:
   a) resin bonding electrically conductive siliconized silicon carbide contacts to first and second ends of a recrystallized silicon carbide resistor where the siliconized silicon carbide contacts, when bonded to the resistor with siliconized silicon carbide, are sized to carry sufficient current to the silicon carbide resistor to obtain a temperature rise in the resistor above 600° C., without a more than 100° C. rise in temperature of free ends of the contacts;
   b) placing the silicon carbide resistor with resin bonded siliconized silicon carbide contacts into an induction heating furnace having an induction coil which heats electrically conductive material in the furnace when sufficient electrical power at a frequency of from about 300 to about 1000 KC is passed through the coil;
   c) causing sufficient electrical power at a frequency of from about 300 to about 1000 KC to be passed through the coil to raise the temperature of the siliconized silicon carbide contacts and recrystallized silicon carbide resistor to a temperature above about 1500° C. at the regions of the resin bonds to pyrolize the resin and cause silicon metal to flow from the contacts into the recrystallized silicon carbide to form a siliconized silicon carbide bond between the contacts and resistor; and
   d) cooling the resulting recrystallized silicon carbide resistor to obtain a recrystallized silicon carbide resistor having siliconized silicon carbide contacts connected with siliconized silicon carbide bonds.

3. The method of claim 2 wherein the silicon metal flows from the contacts into the recrystallized silicon carbide to form a siliconized silicon carbide bond between the contacts and resistor in a partial vacuum of less than 20 Torr.

4. The method of claim 3 where the vacuum is less than 5 Torr.

5. The method of claim 2 wherein the silicon metal flows from the contacts into the recrystallized silicon carbide to form a siliconized silicon carbide bond between the contacts and resistor in an inert atmosphere comprising an inert gas.

6. The method of claim 5 wherein the inert gas is argon.

7. The method of claim 2 wherein the contacts are resin bonded to a resistor having a maximum width, exclusive of contacts, of from about 5 mm to about 100 mm, a length of from about 25 mm to about 2M and a ratio of length to maximum width in mm of from about 5:1 to about 50:1.

8. The method of claim 2 wherein the resistor and contacts are heated and bonded by siliconized silicon carbide in less than about 10 minutes.

9. The method of claim 2 wherein energy required to heat and bond the resistor and contacts is less than ten percent of energy required to create a similar bond in an electric resistance heated tube furnace.

10. The method of claim 1 wherein the silicon carbide and siliconized silicon carbide structures have longitudinal axes and the structures are bonded together so that the longitudinal axes are at an angle of between 20 and 90 degrees to each other.

11. The method of claim 1 wherein the silicon carbide structure and siliconized carbide structure and siliconized silicon carbide structure are placed into the furnace and are surrounded by zirconia bubbles as insulation.

12. The method of claim 2 wherein a plurality of silicon carbide structures secured to siliconized silicon carbide structures are simultaneously placed into the induction heating furnace at least partially within an induction coil.

13. The method of claim 1 wherein the structures have longitudinal axes, silicon carbide structures are secured to siliconized silicon carbide structures so that their longitudinal axes are coextensive to form a unit having a coextensive longitudinal axis and a plurality of units are placed into the induction heating furnace so that longitudinal axes of the plurality of units are parallel.

* * * * *